Patented Mar. 12, 1946

UNITED STATES PATENT OFFICE 2,396,458

2,396,458

METHOD FOR THE PURIFICATION OF TITANIUM TETRACHLORIDE

Sandford S. Cole, Metuchen, and Walter F. Meister, Elizabeth, N. J., assignors to National Lead Company, New York, N. Y., a corporation of New Jersey No Drawing. Application September 26, 1944, Serial No. 555,902

2 Claims. (Cl. 23—87)

This invention relates to the decolorization and purification of titanium halide, particularly titanium tetrachloride. It has particular reference to the decolorization and purification of crude titanium tetrachloride containing dissolved chlorine gas.

This application is a continuation-in-part of co-pending application, Serial No. 457,972, filed September 11, 1942.

That the discoloring impurities cannot be satisfactorily eliminated from titanium tetrachloride by straight fractional distillation is well-known, and various treatments for the elimination of such impurities, including vanadium, have been proposed in the prior art. Thus, purification of titanium tetrachloride has been carried out by treatment with certain metals alone, such as iron in powder form, or with sodium amalgam prior to distillation. It has, however, been found that such treatments are not entirely satisfactory, repeated treatments and distillations being necessary for a substantially complete removal of these impurities.

Other purifying treatments for titanium tetrachloride, such as with di- and trichloride of titanium activated inorganic compounds such as alumina, silica, or titanium dioxide, and certain organic compounds capable of polymerization have recently been disclosed in the art.

In co-pending application, Serial Number 457,970, filed by one of us on September 11, 1942, there is described a method for the purification of crude titanium tetrachloride which comprises the refluxing of the crude titanium tetrachloride in admixture with hydrated forms of iron sulfate which are capable of giving up water of hydration at temperatures below the boiling point of titanium tetrachloride whereby the impurities are eliminated and, subsequent to such treatment, the titanium tetrachloride is recovered as a substantially pure, water-white liquid by a single distillation.

In co-pending application, Serial Number 457,971, filed by one of us on September 11, 1942, there is described a method for purifying crude titanium tetrachloride which comprises refluxing crude titanium tetrachloride in admixture with small amounts of an alkali metal hydroxide, finely-divided metal, and water whereby the impurities are eliminated and, subsequent to which treatment, substantially pure water-white titanium tetrachloride is recovered by a single distillation.

In both the aforesaid applications, it is pointed out that occluded gases should preferably be eliminated prior to the treatment of crude titanium tetrachloride in accordance with the inventions therein described. When titanium tetrachloride is obtained by chlorination of a titaniferous material, chlorine gas is always found occluded in the crude titanium tetrachloride. The presence of chlorine gas, it has been found, will interfere materially with the efficient operation of the heretofore known and above described methods for purifying and decolorizing titanium tetrachloride. By means of the present invention, it is possible to employ such methods without deleterious effects resulting from the presence of the chlorine gas.

It has now been discovered, according to the present invention, that it is possible, by treatments concurrently or simultaneously carried out, to remove the dissolved chlorine gas and the other discoloring contaminants from the crude titanium tetrachloride in a single distillation operation without first eliminating the dissolved chlorine gas by fractional distillation. This is accomplished, according to the invention, by converting the dissolved chlorine gas to antimony chloride having a higher boiling point than titanium tetrachloride. The crude titanium tetrachloride containing chlorine is first contacted with antimony, which at temperatures below 136° C. will form antimony chloride. After the chlorine gas has reacted the decolorization of the crude titanium tetrachloride may be carried out according to any described method for the processes of the aforementioned co-pending applications.

It is also possible, according to the present invention, to react the dissolved chlorine gas simultaneously with the carrying out of the decolorizing treatment. This may be accomplished by treating the crude titanium tetrachloride containing chlorine with antimony, caustic alkali and a small amount of water, or with a mixture of chlorine-binding antimony with copperas.

The function of the antimony in the process of the present invention is primarily to react with the free chlorine gas. This cannot be accomplished by such less expensive powders as zinc or iron. These latter inexpensive metal powders are, however, effective in removing discoloring impurities when used in conjunction with alkali metal hydroxides and a small amount of water. We may, therefore, in order to reduce the overall cost of the decolorization of the crude titanium tetrachloride containing chlorine when treating directly with metal powder, alkali metal hydroxide and water, use a combination of antimony and the less expensive zinc or iron powder, employing only enough antimony to strip the crude liquid of dissolved chlorine gas.

Accordingly, it is among the objects of the present invention to produce a clear water-white titanium tetrachloride. It is a particular object to convert the free chlorine contained in crude titanium tetrachloride to non-volatile chlorides or volatile water-white chlorides. Other objects will be apparent from the following description.

According to one of the preferred methods of the present invention, the crude titanium tetrachloride containing dissolved chlorine gas is mixed with an excess (over that theoretically required to combine with chlorine contained in the crude tetrachloride) of finely-divided antimony and shaken at an elevated temperature, or refluxed until the free chlorine gas has been reacted. The liquid is then, if necessary, cooled and a small amount of alkali metal hydroxide and water added thereto, whereupon the mixture is heated and refluxed at normal pressure until on distillation a water-white product is obtained. According to another variation of the process of this invention a small amount of a hydrated iron sulfate which is capable of giving off water of hydration at temperatures below about 136° C. instead of caustic alkali and water is added, to the cooled liquid, after treatment with the antimony, followed by refluxing until a water-white distillate is obtainable. As stated above, if sufficient antimony is used it is not necessary to delay the addition of the alkali metal hydroxide and water until the chlorine gas is reacted, but all the necessary treating agents may then be added at once. Thus, copperas may be added at the start together with the antimony.

When reacting the free chlorine gas with the antimony according to the process of the present invention, antimony pentachloride is formed. In the ensuing distillation operation the antimony chloride is volatilized and will, unless precautionary measures are taken be found in the titanium tetrachloride distillate. As antimony pentachloride is a water-white liquid, no discoloration will ensue. However, if a titanium tetrachloride substantially free of antimony chloride is desired, one may, within the scope of this invention, substantially remove such chlorides by careful fractional distillation during the distillation operation.

In order to facilitate the operation, mechanical agitation may be employed, or dry inert gases may be bubbled through the liquid during the treatment and subsequent distillation. Suspended and colloidal matter should preferably be substantially eliminated prior to the treatment of this invention. Because of the reactivity of titanium tetrachloride vapors with water, it is preferable to carry out the distillation in a dry atmosphere.

When subjecting the crude titanium tetrachloride containing dissolved chlorine gas to the various purification treatments, the amount of powdered antimony required for the reaction with the free chlorine gas, according to the process of this invention, and the amount of treating agents required for the removal of the discoloring impurities depends upon the amount of chlorine and other impurities present in the crude liquid and the treating time.

Ordinarily when contacting the crude titanium tetrachloride with powdered antimony, alkalimetal hydroxide and water at normal pressure at a temperature of about 136° C., a total treatment time of from about one hour to about six hours is sufficient using an amount of powdered metal of from about 3 grams to about 20 grams; alkali metal hydroxide from about 4 grams to about 10 grams; and water from about 1 gram to about 5 grams, all calculated per liter of crude liquid. In case of the use of copperas the amount of powdered metal required depends solely upon the amount of chlorine gas present in the titanium tetrachloride. The amount of copperas ordinarily required will be equal to from about 5 grams $FeSO_4$ to about 10 grams $FeSO_4$ per liter of crude titanium tetrachloride.

The alkali metal hydroxide may be added, for example, in the form of beads or small pieces, in dry form or moistened with water or in the form of an aqueous concentrated solution. The latter procedure facilitates the introduction of a small amount of water required in the purification. The copperas is preferably introduced in a comminuted state.

The treatments of the present invention are very efficient and a recovery of more than 95% of the titanium tetrachloride is obtained in the single distillation.

The residue which accumulates from the present treatments and which contains impurities which have been removed from the crude titanium tetrachloride may be treated for the recovery of possible remaining titanium tetrachloride and residual values, such as those of nondistillable titanium compounds and other impurities, e. g. vanadium.

Having in the foregoing broadly described our invention, the following example is given for illustrative purposes:

*Example*

To 125 cc. of the crude titanium tetrachloride containing about 2 grams per liter dissolved chlorine gas was added 1.0 gram pure powdered antimony metal, 0.5 gram dry NaOH and 0.2 gram $H_2O$. The mixture was heated at 136° C. under reflux condenser for 4 hours and then distilled. The distillate was water-white and the content of vanadium and iron, as determined spectographically, .002% V and .001% $Fe_2O_3$.

From the foregoing description and examples, it will be appreciated that by means of the present invention there is attained, not only a purification of the titanium tetrachloride but also a recovery of the chlorine values contained therein as metal chloride.

The invention has in the foregoing been described in connection with certain details of operation and specific examples; it is, however, not intended that such description and examples shall be interpreted as imposing limitations upon its scope except insofar as they are not included in the accompanying claims, which should be interpreted as broadly as possible.

The invention has been described with reference to the treatment of titanium tetrachloride, but it should be understood that the other titanium halides, titanium tetrabromide and titanium tetrafluoride, may be decolorized in similar manner.

We claim:

1. A method for treating crude titanium tetrachloride containing free chlorine gas which comprises admixing said crude titanium tetrachloride with a small amount of antimony and heating the mixture until the chlorine gas contained in said crude titanium tetrachloride is converted to antimony chloride.

2. A method for treating titanium tetrachloride containing free chlorine gas which comprises admixing crude titanium tetrachloride with a small amount of antimony, heating the mixture until the chlorine gas contained in said crude titanium tetrachloride is converted to antimony chloride and thereafter separating said antimony chloride from the titanium tetrachloride.

SANDFORD S. COLE.
WALTER F. MEISTER.